United States Patent
Cipriano et al.

(10) Patent No.: US 10,864,682 B2
(45) Date of Patent: Dec. 15, 2020

(54) METHOD OF JOINING OF POLYMERIC COMPOSITES

(71) Applicant: GM GLOBAL TECHNOLOGY OPERATIONS LLC, Detroit, MI (US)

(72) Inventors: Steven Cipriano, Chesterfield Township, MI (US); Bradley J. Blaski, Sterling Heights, MI (US); Richard C. Janis, Grosse Pointe Woods, MI (US); Pei-chung Wang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 142 days.

(21) Appl. No.: 15/911,683

(22) Filed: Mar. 5, 2018

(65) Prior Publication Data

US 2019/0270258 A1 Sep. 5, 2019

(51) Int. Cl.
| | |
|---|---|
| B29C 65/56 | (2006.01) |
| B29C 65/48 | (2006.01) |
| B29C 65/00 | (2006.01) |
| B29K 705/00 | (2006.01) |

(52) U.S. Cl.
CPC ............ B29C 65/561 (2013.01); B29C 65/48 (2013.01); B29C 66/02 (2013.01); B29C 66/30321 (2013.01); B29C 66/30325 (2013.01); B29C 66/7212 (2013.01); *B29K 2705/00* (2013.01); *B29K 2907/04* (2013.01)

(58) Field of Classification Search
CPC ....... B29C 65/561; B29C 65/48; B29C 66/02; B29C 66/30321; B29C 66/30325; B29C 66/7212
See application file for complete search history.

(56) References Cited

U.S. PATENT DOCUMENTS

| | | | | |
|---|---|---|---|---|
| 2,607,447 | A * | 8/1952 | Tuttle ................ | F16B 5/01 52/787.12 |
| 7,862,271 | B2 | 1/2011 | Wang et al. | |
| 9,023,455 | B2 * | 5/2015 | McKelvey Campbell ................ | B23P 11/00 428/137 |
| 2003/0134090 | A1 * | 7/2003 | Tate .................... | B62D 29/005 428/174 |
| 2015/0337886 | A1 * | 11/2015 | Coronado ............. | B23P 19/04 411/171 |
| 2017/0130751 | A1 * | 5/2017 | Norton ................. | B29C 65/56 |

(Continued)

OTHER PUBLICATIONS

"High-performance lightweight structures with fiber reinforced thermoplastics and structured metal think sheet", published on Nov. 24, 2014, p. 30, 2.2 flow drill joining concept and p. 33, 3.2 global in-plane fiber alignment; published by Canadian center of science and education (Year: 2014).*

*Primary Examiner* — Jeffry H Aftergut
*Assistant Examiner* — Jaeyun Lee

(57) ABSTRACT

A method of joining first and second layers of polymeric composite material includes disposing a portion of a molded insert having a bottom end into a top surface of a first layer of material and then applying a layer of adhesive between the top surface of the first layer and a bottom surface of a second layer of material to create a bond-line thickness. Next, a top surface of the second layer is pierced with a headless end of a fastener and interlocked into the molded insert. A layer of protective coating is then applied to the top surface of the second layer of material to cover the interlocked fastener.

18 Claims, 2 Drawing Sheets

(56) References Cited

U.S. PATENT DOCUMENTS

2018/0169961 A1* 6/2018 Simonin .................... C09J 5/06
2018/0209468 A1* 7/2018 Freis ..................... F16B 33/008

* cited by examiner

METHOD OF JOINING OF POLYMERIC COMPOSITES

FIELD

The present disclosure relates to methods of joining polymeric composites and other materials using flow screws or other suitable fasteners.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Carbon fiber reinforced thermoplastics (CFRTP) such as carbon fiber reinforced nylon composites have a high strength-to-weight ratio and high corrosion resistance, which makes these materials desirable for use in automotive applications. For example, to reduce vehicle weight, these materials have been used in parts such as air intake manifolds, air filter housings, resonators, timing gears, radiator fans, truck beds and radiator tanks. Despite these advantages, the number of applications for CRFTP materials is limited due to the current processes available for joining CRFTP materials. Therefore, a need exists for improved processes for joining CRFTP materials.

SUMMARY

One or more exemplary embodiments address the above issue by providing a method of joining first and second layers of material.

According to an aspect of an exemplary embodiment, a method of joining first and second layers of material includes disposing a portion of a molded insert having a bottom end into a top surface of a first layer of material. Another aspect includes applying a layer of adhesive between the top surface of the first layer and a bottom surface of a second layer of material to create a bond-line thickness. And another aspect includes piercing through a top surface of the second layer of material with a headless end of a fastener. And yet another aspect includes interlocking the headless end of the fastener into the molded insert. And still another aspect includes applying a layer of protective coating to the top surface of the second layer of material to cover the interlocked fastener.

A further aspect in accordance wherein the fastener is a flow screw. And another aspect includes positioning the first and second layers on a die after applying the adhesive layer between the first and second layers and before piercing the second layer of material with the headless end of the flow screw. Still another aspect includes interlocking the flow screw until the headless end pierces the bottom end of the molded insert. Yet another aspect wherein the first and second layers each include a carbon fiber composite material. And yet another aspect wherein the bond line thickness is in the range of 0.1 mm to 1.5 mm. And still another aspect includes allowing a top end of the molded insert to protrude above the top surface of the first layer of material a predetermined distance equal to the bond-line thickness. And one other aspect includes allowing the adhesive layer to at least partially cure. And still one other aspect includes piercing through a top surface of the second layer of material with a headless end of a flow screw after the adhesive layer is at least partially cured.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1A:
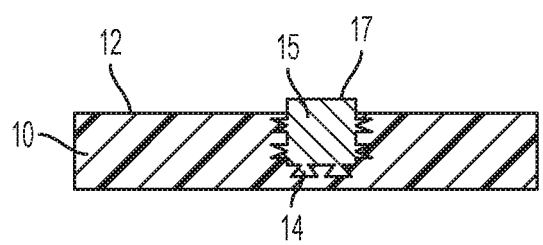
FIG. 1A is an illustration of a first layer of material having a molded insert disposed in a top surface in accordance with an exemplary embodiment of a method for joining first and second layers of materials.

One process for joining CRFTP materials is with a fastening process such as flow screw insertion. In this process, a flow screw is inserted into multiple layers of material (or workpieces) to join the layers together. The materials layers may include, but not limited to, all polymeric composites, polymers, polymeric composite-metal combinations. The flow screw includes a head and a headless end or tail designed to pierce through material. When the flow screw is inserted downward into the layers, the headless end pierces through the top layer and then into the bottom layer. However, it is common that this type of mechanical fastening of layers of CRFTP materials have low joint strength in addition to the fastened joints being susceptible to weakening due to galvanized corrosion over time.

A process for joining first and second layers of materials, more particularly CRFTP materials, according to aspects of the exemplary embodiment addresses these issues by using a flow screw and a molded insert that are designed so that the headless end of the flow screw penetrates into and through a top layer of material and then becomes interlocked into a molded insert disposed in a bottom layer of material. The molded insert serves to improve the mechanical interlock between the flow screw and the layers of materials and the overall joint quality. The molded insert can be made of various materials. The basic necessity is that the molded Insert must be harder than the composite material that it is molded into and softer than the fastener that will be inserted into it, e.g., metal, hardened metal and polymer composites.

The size of the molded insert can vary. It can be small for insertion of one fastener or be large/long for inserting multiple fasteners, e.g., a strip along a part flange. The molded insert can also be applied to a single sheet of material or be involved with multiple material stack ups without exceeding the scope of the exemplary embodiment.

Referring now to FIGS. 1A, 1B, 1C, and 1D, an example of a flow screw joining process for joining multiple layers of material is illustrated. In this process, a top surface 12 of a first layer 10 of material having a thickness in the range of 0.5 mm-6 mm is disposed with a portion of a molded insert 15 having a bottom end 14. The molded insert 15 may be integrated into the first layer of material 10 as part of a material fabricating process, e.g., molding, or may be inserted in the material through a separate secondary process known to those skilled in the art.

Figure 1B:
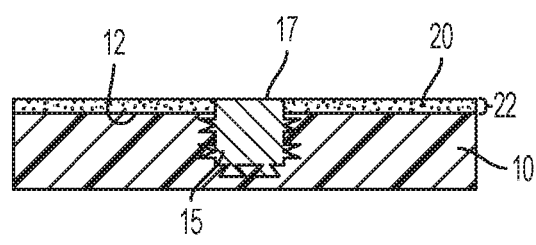
FIG. 1B is an illustration of the first layer of material and molded insert of FIG. 1A further including an adhesive layer applied to the top surface of the first layer in accordance with aspects of the exemplary embodiment.

FIG. 1B illustrates the top surface 12 of the first layer of material 10 and the molded insert 15 being covered with an adhesive layer 20 to create a bond-line thickness 22. A top end 17 of the molded insert 15 is preferably allowed to protrude above the top surface 12 of the first layer of material 10 a predetermined distance equal to the bond-line thickness 22 such that after the joining process the protruded portion of the molded insert 15 serves to maintain the bond-line thickness 22.

Figure 1C:
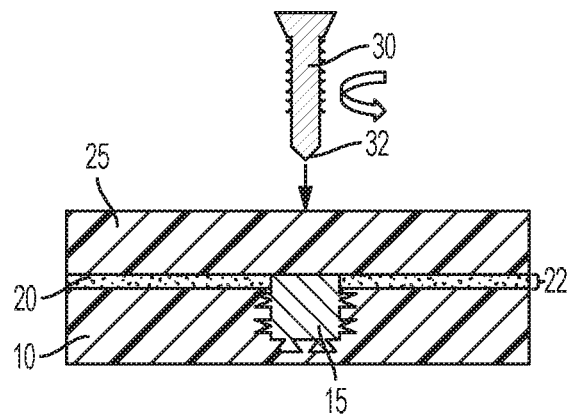
FIG. 1C is an illustration of FIG. 1B further including a second layer of material and a joining fastener in accordance with aspects of the exemplary embodiment.

Referring now to FIG. 1C, a bottom surface of a second layer of material 25 is placed on the adhesive layer 20 and preferably allowed to partially cure before inserting the flow screw 30. The first 10 and second 25 layers may be relatively flat sheets having a thickness in the range of 0.5 mm-6 mm, and placed onto a fastener insertion machine (not shown). The flow screw 30 includes a headless end 32 which pierces through a top surface of the second layer of material 25 with the headless end 32. The headless end 32 of the flow screw 30 is sharp such that when the flow screw 30 is spun at high speeds and under an axial load it easily penetrates into the second layer of material 25.

Figure 1D:
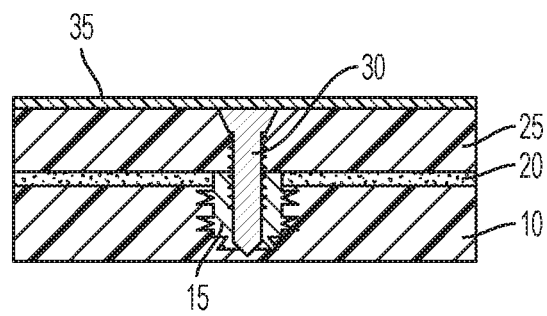
FIG. 1D is an illustration of FIG. 1C wherein the first and second layers of material are joined and a layer of protective coating covers the top surface of the second layer of material in accordance with aspects of the exemplary embodiment.

FIG. 1D illustrates the first 10 and second 25 layers of material after the joining process is complete. After piercing through the second layer of material 25 the flow screw 30 is aligned such that the headless end 32 becomes interlocked into the molded insert 15 until the headless end 32 pierces the bottom end 14 of the molded insert 15. Typically, mechanical fasteners have low joint strength in composite to composite joints but by introducing the molded insert 15 into the joining process as according to the exemplary embodiment the mechanical joint is improved and the bond-line thickness can be maintained. After the joining process is complete, a layer of protective coating is applied to the top surface 12 of the second layer of material 25 to cover the interlocked flow screw 30. This seals the flow screw so that water would not get into the interfaces between the screw and CFRTP. As a result, the galvanic corrosion (i.e., corrosion damage induced on steel) can be minimized.

Figure 2:
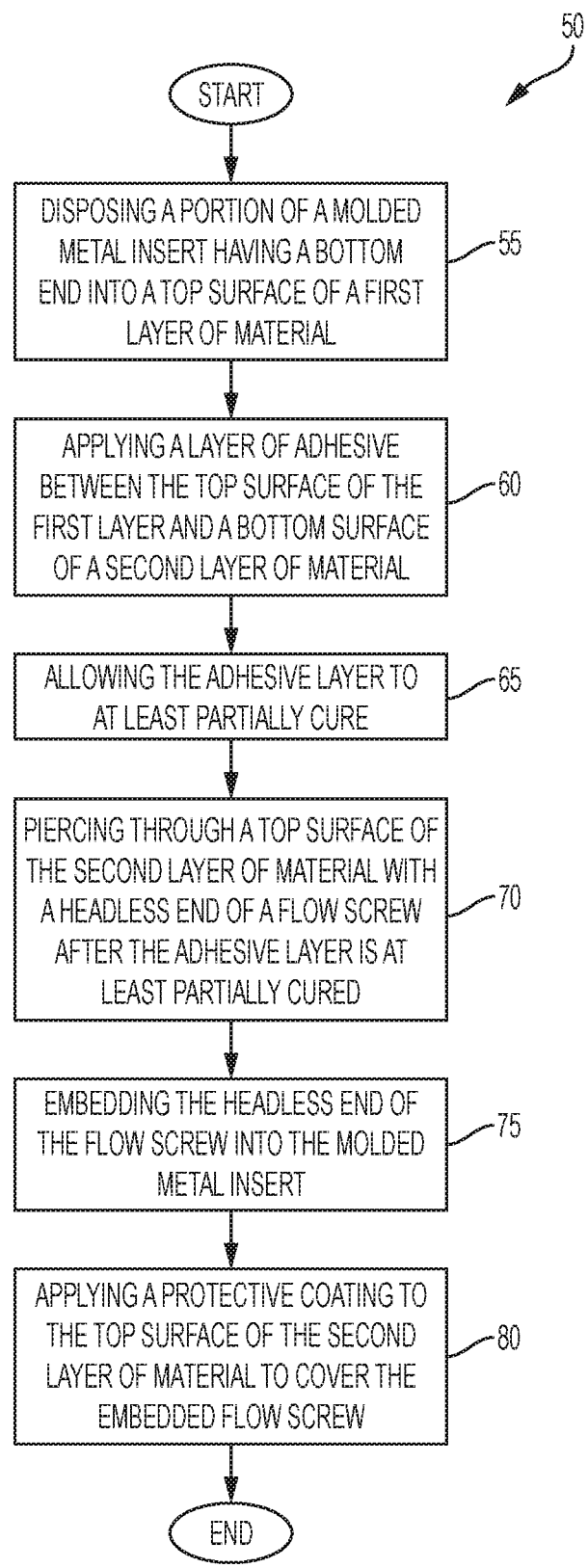
FIG. 2 is a flow diagram for a method of joining first and second layers of material as according to the exemplary embodiment.

Referring now to FIG. 2, a method 50 for joining first and second layers of material is provided. This method is suitable for joining different types of layered materials but is notably a preferred method for joining CRFTP material or similar polymeric composites.

At block 55, the method begins with disposing a portion of a molded insert 15 having a bottom end 14 into a top surface 12 of a first layer of material 10.

At block 60, the method continues with applying a layer of adhesive 20 between the top surface 12 of the first layer of material 10 and a bottom surface of a second layer of material 25. Next, at block 65, the adhesive layer 20 is allowed to at least partially cure.

At block 70, the method continues with piercing through a top surface of the second layer of material 25 with a headless end 32 of a flow screw 30 after the adhesive layer 20 is at least partially cured.

At block 75, the headless end 32 of the flow screw 30 is interlocked into the molded insert 15 disposed in the first layer of material 10.

Finally, at block 80, the method ends with applying a protective coating 35 to the top surface of the second layer of material 25 to cover the interlocked flow screw 30.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A method of joining first and second layers of material, the method comprising:
    disposing a portion of a molded insert having a bottom end into a top surface of a first layer of material;
    applying a layer of adhesive between the top surface of the first layer and a bottom surface of a second layer of material to create a bond-line thickness;
    piercing through a top surface of the second layer of material with a headless end of a fastener;
    interlocking the headless end of the fastener into the molded insert; and
    applying a layer of protective coating to the top surface of the second layer of material to cover the interlocked fastener.

2. The method of claim 1 wherein the fastener is a flow screw.

3. The method of claim 2 further comprising positioning the first and second layers on a fastener insertion machine after applying the adhesive layer between the first and second layers and before piercing the second layer of material with the headless end of the flow screw.

4. The method of claim 3 further comprising interlocking the flow screw until the headless end pierces the bottom end of the molded insert.

5. The method of claim 1 wherein the first and second layers each include a carbon fiber composite material.

6. The method of claim 1 wherein the bond line thickness is in a range of 0.1 mm to 1.5 mm.

7. The method of claim 1 further comprising allowing a top end of the molded insert to protrude above the top surface of the first layer of material a predetermined distance equal to the bond-line thickness.

8. The method of claim 1 further comprising allowing the adhesive layer to at least partially cure.

9. The method of claim 8 further comprising piercing through a top surface of the second layer of material with a headless end of the fastener after the adhesive layer is at least partially cured.

10. A method of joining first and second layers of material, the method comprising:
   disposing a portion of a molded insert having a bottom end into a top surface of a first layer of material;
   applying a layer of adhesive between the top surface of the first layer and a bottom surface of a second layer of material to create a bond-line thickness;
   piercing through a top surface of the second layer of material with a headless end of a flow screw;
   interlocking the headless end of the flow screw into the molded insert; and
   applying a layer of protective coating to the top surface of the second layer of material to cover the interlocked flow screw.

11. The method of claim 10 further comprising positioning the first and second layers on a fastener insertion machine after applying the adhesive layer between the first and second layers and before piercing the second layer of material with the headless end of the flow screw.

12. The method of claim 11 further comprising interlocking the flow screw until the headless end pierces the bottom end of the molded insert.

13. The method of claim 10 wherein the first and second layers each include a carbon fiber composite material.

14. The method of claim 10 wherein the bond line thickness is in a range of 0.1 mm to 1.5 mm.

15. The method of claim 10 further comprising allowing a top end of the molded insert to protrude above the top surface of the first layer of material a predetermined distance equal to the bond-line thickness.

16. The method of claim 10 further comprising allowing the adhesive layer to at least partially cure.

17. The method of claim 16 further comprising piercing through a top surface of the second layer of material with a headless end of a flow screw after the adhesive layer is at least partially cured.

18. A method of joining first and second layers of material, the method comprising:
   disposing a portion of a solid molded insert having a bottom end into a top surface of a first layer of material;
   applying a layer of adhesive between the top surface of the first layer and a bottom surface of a second layer of material to create a bond-line thickness;
   piercing through a top surface of the second layer of material and the molded insert with a headless end of a fastener;
   interlocking the headless end of the fastener into the molded insert; and
   after the step of interlocking, applying a layer of protective coating to the entire top surface of the second layer of material to cover the interlocked fastener.

\* \* \* \* \*